United States Patent [19]
Sato

[11] Patent Number: 6,101,522
[45] Date of Patent: Aug. 8, 2000

[54] PRODUCT-SUM CALCULATION CIRCUIT CONSTRUCTED OF SMALL-SIZE ROM

[75] Inventor: Yuichi Sato, Mie-ken, Japan

[73] Assignee: Sharp Kabushiki Kaisha, Osaka, Japan

[21] Appl. No.: 09/086,486

[22] Filed: May 29, 1998

[30] Foreign Application Priority Data

May 29, 1997 [JP] Japan ................................ 9-139907

[51] Int. Cl.[7] ................ G06F 7/00; G06F 7/52
[52] U.S. Cl. ........................... 708/603; 708/620
[58] Field of Search ................. 708/319, 525, 708/603, 620, 625

[56] References Cited

U.S. PATENT DOCUMENTS

| | | | |
|---|---|---|---|
| 4,423,488 | 12/1983 | Campbell | 708/319 |
| 4,484,299 | 11/1984 | Lambourn et al. | 708/319 |
| 4,566,075 | 1/1986 | Guttag | 708/625 |
| 4,679,164 | 7/1987 | Rearick | 708/620 |
| 4,709,343 | 11/1987 | Van Cang | 708/319 |
| 5,255,216 | 10/1993 | Blanz et al. | 708/620 |
| 5,262,973 | 11/1993 | Richardson | 708/525 |

*Primary Examiner*—Tan V. Mai

[57] ABSTRACT

There is provided is a product-sum calculation circuit which can be constructed of a ROM having a small capacity. In this product-sum calculation circuit, when multiplier selection signals A0 through A2 select X as a multiplier, a second selector circuit 103 selects a product $C_k \times X$ obtained by multiplying a multiplicand $C_k$ by the multiplier X and outputs the same to an output control circuit 104. In this case, the output control circuit 104 outputs the product $C_k \times X$ without shifting the same. When the multiplier selection signals A0 through A2 select $(2^n)X$ as the multiplier, the second selector circuit 103 selects the product $C_k \times X$ obtained by multiplying the multiplicand $C_k$ by the multiplier X and outputs the same to the output control circuit 104 similar to the case where the multiplier X is selected. In this case, the output control circuit 104 outputs $(2^n)$-fold value of $(C_k \times X)$ by shifting leftward the product $C_k \times X$ by n bits. Therefore, merely by storing $(C_k \times X)$ in a data storage circuit 102, a $(2^n)$-fold output of $(C_k \times X)$ can be obtained.

3 Claims, 6 Drawing Sheets

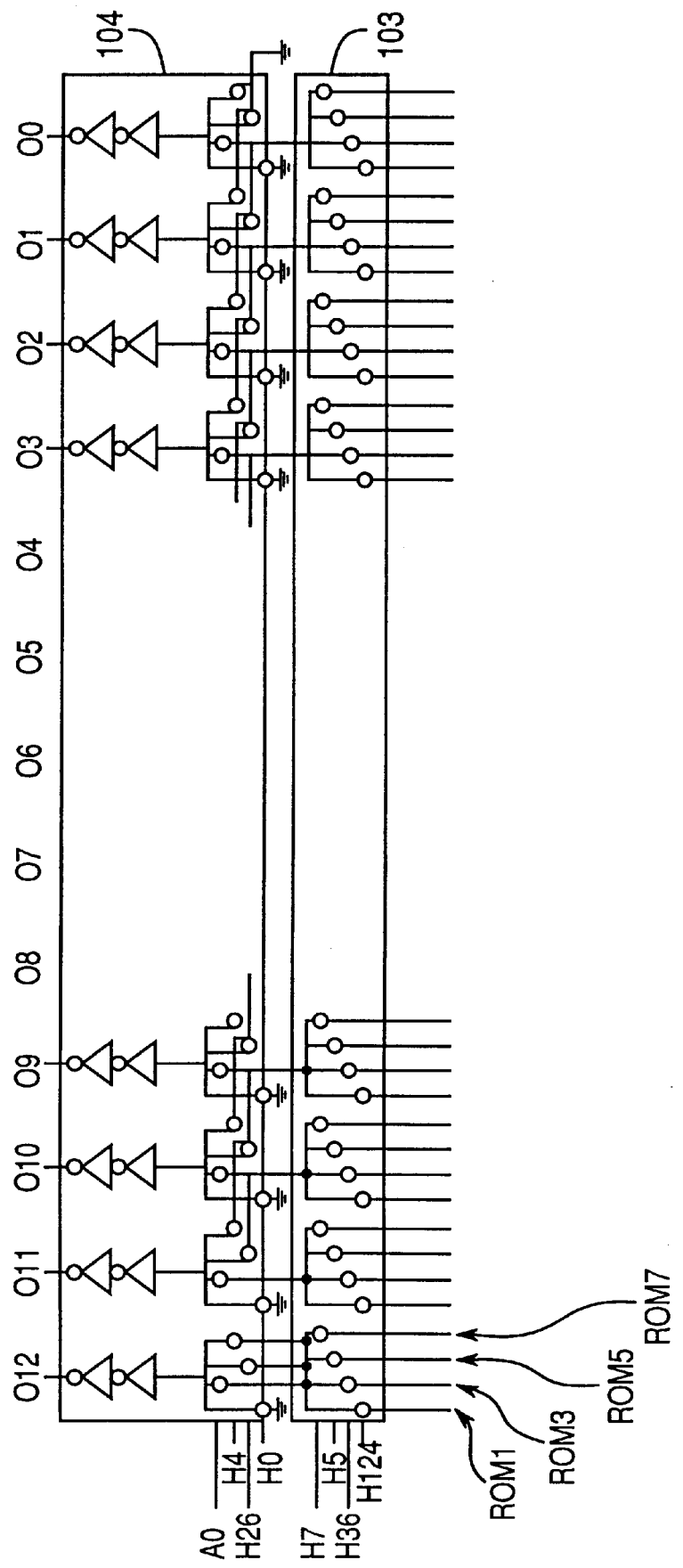

| A6,A5,A4,A3 | A2,A1,A0 | Oj |
|---|---|---|
| 0 0 0 0 | 0 0 0 | C0×0 |
| | 0 0 1 | C0×1 |
| | 0 1 0 | C0×2 |
| | 0 1 1 | C0×3 |
| | 1 0 0 | C0×4 |
| | 1 0 1 | C0×5 |
| | 1 1 0 | C0×6 |
| | 1 1 1 | C0×7 |
| 0 0 0 1 | 0 0 0 | C1×0 |
| | 0 0 1 | C1×1 |
| | 0 1 0 | C1×2 |
| | 0 1 1 | C1×3 |
| | 1 0 0 | C1×4 |
| | 1 0 1 | C1×5 |
| | 1 1 0 | C1×6 |
| | 1 1 1 | C1×7 |
| ⋮ | ⋮ | ⋮ |

PRODUCT-SUM CALCULATION CIRCUIT CONSTRUCTED OF SMALL-SIZE ROM

BACKGROUND OF THE INVENTION

The present invention relates to a product-sum calculation circuit constructed mainly of ROM (Read Only Memory) circuits.

In regard, to multimedia, compression and decompression of images are important. As a technique of the compression and decompression of images, there is a method using discrete cosine transform. In order to execute the discrete cosine transform, a product-sum calculation with a constant is required.

The method of executing the product-sum calculation by means of multipliers and adders is well known. In regard to the product-sum calculation of the discrete cosine transform, there is also known the method of achieving a product-sum calculation by recording an integral multiple value of a constant into a ROM (Read Only Memory) when one of a multiplier and a multiplicand is a constant, obtaining multiplication results from the ROM by connecting a variable to an address of the ROM and cumulatively summing up the multiplication results.

FIG. 7 shows a product-sum calculation circuit constructed of a register 501, ROMs 502, 503 and 504 and adders 507, 508 and 509.

Multipliers Xi (X0 through X8) are stored in the register 501. Locations in which multipliers X0, X1 and X2 are stored are connected to addresses A0, A1 and A2 of the ROM 502. Locations in which multipliers X3, X4 and X5 are stored are connected to the addresses A0, A1 and A2 of the ROM 503. Locations in which multipliers X6, X7 and X8 are stored are connected to the addresses A0, A1 and A2 of the ROM 504.

Signal lines for transmitting a signal CSELi (CSEL0, CSEL1, . . . ) for selecting a constant Ck (C0, C1, . . . , C16) which serves as a multiplicand are connected to addresses A3, A4, A5 and A6 of the ROM 502, ROM 503 and ROM 504. Then, the ROMs 502, 503 and 504 store therein zerofold, onefold, twofold, threefold, fourfold, fivefold, sixfold and sevenfold values Oj (O0, O1, . . . ) of the multiplicand Ck.

Then, this product-sum calculation circuit calculates the following product-sum calculation result Yi.

$$Yi = \Sigma Ck \cdot Xi$$

As shown in FIG. 8, the ROM 502, ROM 503 and ROM 504 are designed so as to be able to select any one of sixteen multiplicands Ck (k=0, 1, . . . , 16) by the addresses A3, A4, A5 and A6. The ROMs 502 through 504 can select any one of the multipliers 0, 1, 2, 3, 4, 5, 6 and 7 by the addresses A0, A1 and A2.

For example, the multiplicand C0 is selected by the addresses (A6, A5, A4, A3)=(0, 0, 0, 0), the multiplier Xi=1 is selected by the addresses (A2, A1, A0)=(0, 0, 1) and the onefold value of C0 is outputted as Oj from the ROM 502. If the addresses (A6, A5, A4, A3)=(0, 0, 0, 0) and the addresses (A2, A1, A0)=(1, 0, 1), then the multiplicand C0 and the multiplier Xi=5 are selected, and the fivefold value of the multiplicand C0 is outputted as Oj from the ROM 502.

As described above, the ROMs 502 through 504 store therein the zerofold through sevenfold values of the multiplicand Ck, and by designating the multiplicand Ck and the multiplier Xi by the addresses A0 through A6, the multiplication result Ck×Xi=Oj of the multiplier Xi and the multiplicand Ck can be outputted.

In this product-sum calculation circuit, an adder 507 adds the output of the ROM 503 to the output of the ROM 502 by digitally shifting it in conformity with the output of the ROM 502 in a shifter 506. Then, the adder 508 adds the output of the adder 507 to the output of the ROM 504 which is digitally shifted in conformity with the output of the adder 507 in a shifter 506. Further, an adder 509 adds the output of the adder 508 to the output of a register 510 which is digitally shifted in conformity with the output of the adder 508 in a shifter 511. Through these operations, a product-sum calculation result $Yi = \Sigma Ck \cdot Xi$ is stored into the register 510, thereby attaining the product-sum calculation.

In regard to the 3-bit partial products ROMs 502, 503 and 504 of the prior art product-sum calculation circuit shown in FIG. 7, it is required to record for each constant Ck the zerofold value, onefold value, twofold value, threefold value, fourfold value, fivefold value, sixfold value and sevenfold value of the constant Ck as ROM data as shown in FIG. 8.

The above has the problem that the ROM size increases and the consumption power increases.

For example, in the product-sum calculation circuit provided with a 4-bit partial product ROM, it is required to record for each constant the zerofold value, onefold value, . . . , fourteenfold value and fifteenfold value of one constant in the ROM, and therefore, the ROM size further increases.

SUMMARY OF THE INVENTION

Accordingly, the object of the present invention is to provide a product-sum calculation circuit which can be constructed of a small-size ROM.

In order to achieve the aforementioned object, the present invention provides a product-sum calculation circuit comprising:

a data storage circuit which stores therein products of a plurality of multiplicands and a plurality of multipliers;

a selecting section which selects a multiplicand and a multiplier, reads out a product signal related to a product of the selected multiplicand and the selected multiplier from the data storage circuit, and outputs the product signal; and a first output control section which determines by selection according to the multiplier or the multiplicand whether to output the product signal outputted from the selecting section while shifting the product signal by n (n: integer) bits or output the product signal without shift, and outputs the product signal in the selected manner.

According to the present invention, when a multiplier X and a multiplicand Ck are selected, the selecting section selects a product Ck×X obtained by multiplying a multiplicand Ck by the multiplier X and outputs the product to the first output control section. Then, the first output control section outputs the product Ck×X without shifting the product.

When (2×n)X is selected as the multiplier, the selecting section selects the product Ck×X obtained by multiplying the multiplicand Ck by the multiplier X and outputs the product to the first output control section similar to the case where the multiplier X is selected. In this case, the first output control section shifts leftward the product Ck×X by n (n: integer) bits to output the $(2^n)$-fold value of (Ck×X).

Therefore, assuming that X is an odd-number, not only the data of the odd-number-fold data of Ck but also the $(2^n)$-fold data of Ck×X can be outputted merely by storing the odd-number-X-fold data Ck×X of the multiplicand Ck in the data storage circuit. Therefore, the amount of data to be stored in the data storage circuit can be reduced, by which the product-sum calculation circuit can be constructed so as to have a small storage capacity and the consumption power can be reduced.

When the first output control section shifts rightward the product Ck×X by n bits, $(2^{-n})$-fold data of Ck×X can be outputted.

In the product-sum calculation circuit of one embodiment comprises a second output control section which executes addition or subtraction on the product signal outputted from the first output control section, and outputs the executed product signal.

According to the invention of this embodiment, when the multiplier X is selected, the product Ck×X is selected by the selecting section, and the product is outputted to the second output control section without being shifted through the first output control section. Then, the second output control section outputs the product Ck×X. When a multiplier 2X is selected, the product Ck×X is selected by the selecting section, and this product Ck×X is shifted leftward by one bit by the first output control section, so that the twofold value of (Ck×X) is outputted to the second output control section. Then, the second output control section outputs the product (Ck×X)×2.

Further, when (X+2X) is selected as the multiplier, the product Ck×X is selected by the selecting section, and. the twofold value of (Ck×X) obtained by shifting leftward the product (Ck×X) by one bit by the first output control section and the product (Ck×X) are outputted to the second output control section. Then, the second output control section can output the threefold value of the product Ck×X by adding (Ck×X) to (Ck×X)×2.

Therefore, according to this embodiment, merely by storing the onefold value of the product Ck×X in the data storage circuit, the onefold, twofold and threefold values of the product Ck×X can be outputted from the second output control section. Therefore, the amount of data to be stored in the data storage circuit can be further reduced and the product-sum calculation circuit can be constructed so as to have a smaller storage capacity. Therefore, the consumption power can be further reduced.

It is acceptable to output the fourfold value of (Ck×X) obtained by shifting leftward the product (Ck×X) by two bits and the product (Ck×X) from the first output control section and subtract (Ck×X) from (Ck×X)×4 in the second output control section when (X+2X) is selected as the multiplier, thereby outputting the threefold value of the product Ck×X. Even in this case, merely by storing the onefold value of the product Ck×X in the data storage circuit, the onefold, threefold and fourfold values of the product Ck can be outputted from the second output control section. Therefore, the storage capacity of the data storage circuit can be reduced, by which the product-sum calculation circuit can be constructed so as to have a smaller storage capacity and the consumption power can be reduced.

In one embodiment, the first output control section comprises an output prohibiting section which prohibits the output of the product signal from the selecting section when zero is selected as the multiplier.

In this embodiment, when zero is selected as the multiplier, the output prohibiting section prohibits the output of the product signal from the second selecting section. Therefore, without storing the zerofold data of the multiplicand in the data storage circuit, the zerofold value of the multiplicand can be outputted.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 a circuit diagram showing a selector circuit and an output control circuit of the first embodiment;

FIGS. 4A, 4B, 4C and 4D are detailed views of parts of the circuit diagram of FIG. 3;

FIG. 8 is a diagram showing data stored in ROMs of the prior art product-sum calculation circuit.

DETAILED DESCRIPTION OF THE PREFERRED EMBODIMENTS

Figures 1, 2:
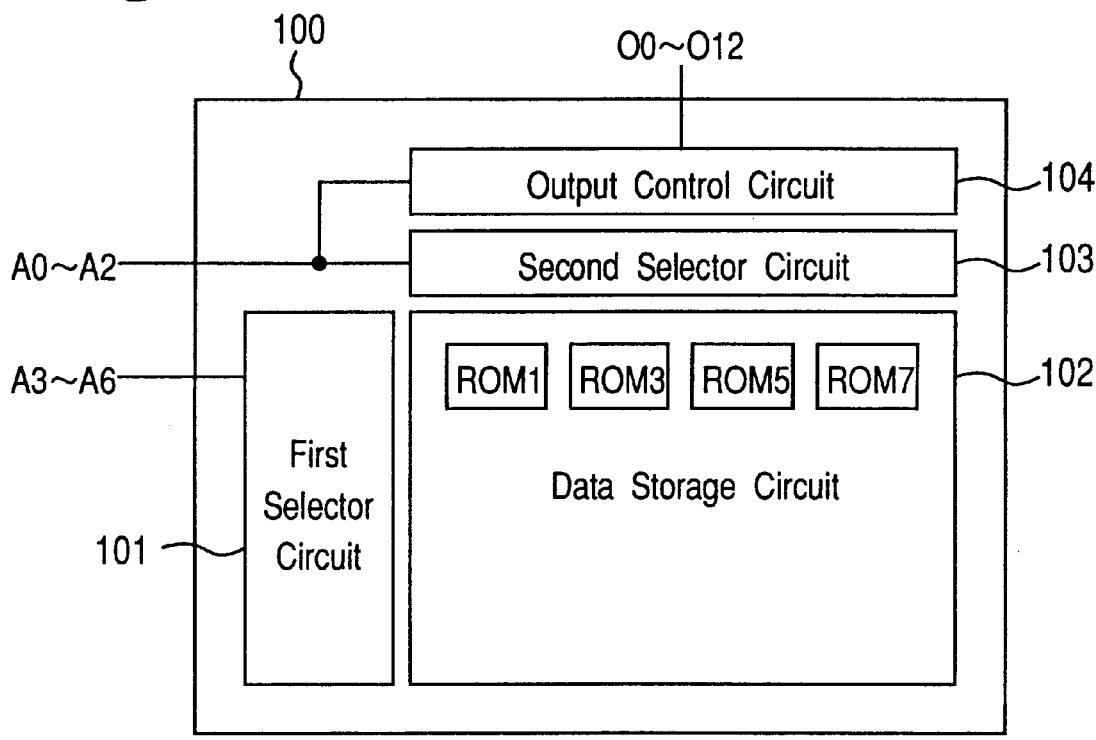
FIG. 1 is a block diagram of a first embodiment of a product-sum calculation circuit of the present invention.
FIG. 2 is a diagram showing an example of data recorded in a data recording circuit of the first embodiment.

The present invention will be described in detail below based on the embodiments thereof shown in the drawings.

First Embodiment

Figure 7:
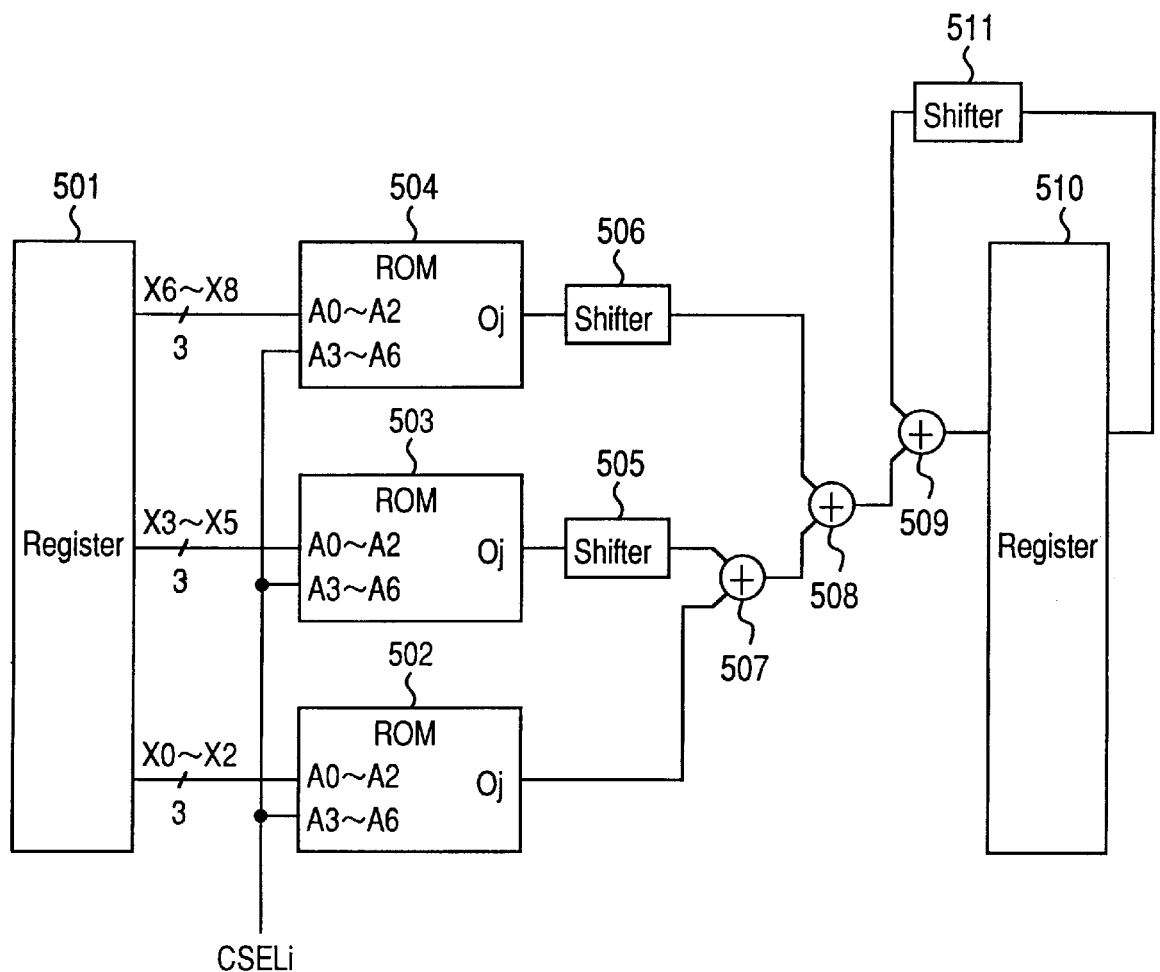
FIG. 7 is a block diagram of a prior art product-sum calculation circuit.

FIG. 1 shows the first embodiment of the product-sum calculation circuit of the present invention. In FIG. 1 is shown a product calculation circuit 100 of the product-sum calculation circuit. This product calculation circuit 100 is connected to a sum calculation circuit (not shown). This sum calculation circuit is similar to that of the prior art shown in FIG. 7, and therefore, no description is provided for it.

This product calculation circuit 100 includes a first selector circuit 101 which serves as part of a selecting section, a data storage circuit 102, a second selector circuit 103 which serves as part of the selecting section and an output control circuit 104.

The first selector circuit 101 decodes 4-bit addresses A3, A4, A5 and A6 to select one multiplicand Ci from 16 multiplicands Ck (k=0, 1, ... , 15). The data storage circuit 102 includes ROM1, ROM3, ROM5 and ROM7.

As shown in FIG. 2, the ROM1 of the data storage circuit 102 stores therein the onefold values (C0 through C15) of the 16 multiplicands Ck. The ROM3 stores therein the threefold values (C0×3 through C15×3) of the multiplicands Ck. The ROM5 stores therein the fivefold values (C0×5 through C15×5) of the multiplicands Ck. The ROM7 stores therein the sevenfold values (C0×7 through C15×7) of the multiplicands Ck.

Therefore, by inputting the 4-bit addresses A3 through A6 to the first selector circuit 101, the first selector circuit 101 selects one multiplicand Ci from the 16 multiplicands Ck. Then, the data storage circuit 102 outputs the onefold value of the multiplicand Ci from the ROM1 to the second selector circuit 103, outputs the threefold value of the multiplicand Ci from the ROM3 to the second selector circuit 103, outputs the fivefold value of the multiplicand Ci from the ROM5 to the second selector circuit 103 and outputs the sevenfold value of the multiplicand Ci from the ROM7 to the second selector circuit 103.

Next, FIG. 3 shows the circuit constructions of the second selector circuit 103 and the output control circuit 104, while FIGS. 4A, 4B, 4C and 4D show in detail the portion relevant to an output o11 of the output control circuit 104.

Figures 4A, 4B, 4C, 4D:
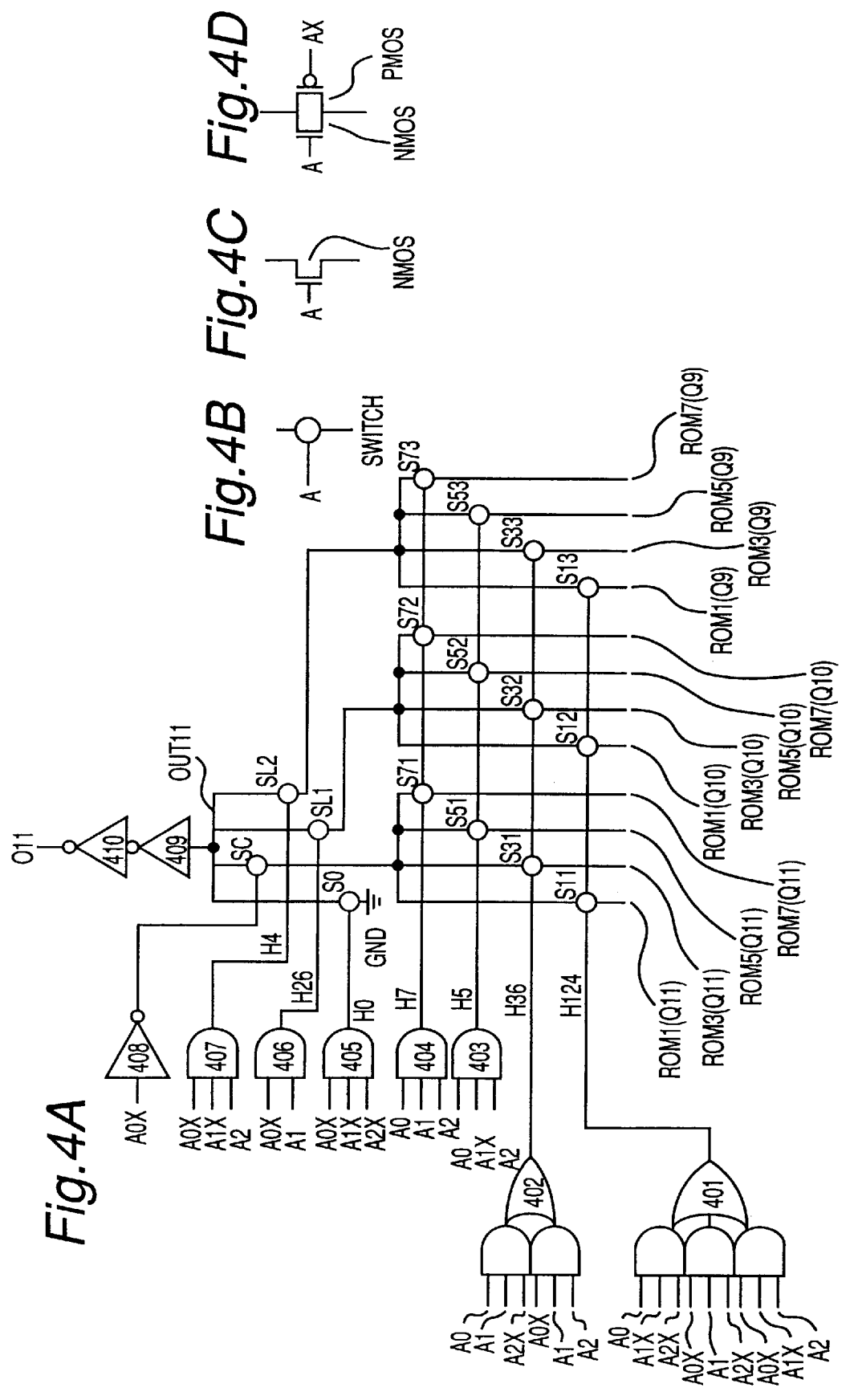

In FIG. 4A, ROM1 (Q11) represents the data of the twelfth bit of the data (C0×1, C1×1, . . . , C15×1) stored in the ROM1. That is, the ROM1 (Q11) represents the data of the twelfth bit of the onefold value of the multiplicand Ci. ROM3 (Q11) represents the data of the twelfth bit of the threefold value of the multiplicand Ci. ROM5 (Q11) represents the data of the twelfth bit of the fivefold value of the multiplicand Ci. ROM7 (Q11) represents the data of the twelfth bit of the sevenfold value of the multiplicand Ci.

In FIG. 4A, A0X, A1X and A2X represent the inverted signals of the input addresses A0, A1 and A2. Further, H0, H124, H26, H3, H36, H4, H5 and H7 are decode signals of the addresses A0 through A2.

The output control circuit 104 has switches S0, SC, SL1 and SL2, and the switches S0, SC, SL1 and SL2 are connected to an inverter 409. The inverter 409 is connected to an inverter 410. The switches S0, SC, SL1 and SL2 (see FIGS. 4A and 4B) are each constructed of an NMOS transistor as shown in FIG. 4C or a parallel circuit of an NMOS transistor and a PMOS transistor as shown in FIG. 4D.

Then, the output of an AND circuit 405 is connected to the gate terminal of the switch S0, while the output of an AND circuit 406 is connected to the gate terminal of the switch SL1. The output of an AND circuit 407 is connected to the gate terminal of the switch SL2, while the output of an inverter 408 is connected to the gate terminal of the switch SC.

Switches S11, S31, S51 and S71 of the second selector circuit 103 are connected in parallel and connected with the switch SC of the output control circuit 104. Switches S12, S32, S52 and S72 of the second selector circuit 103 are connected in parallel and connected with the switch SL1 of the output control circuit 104. Switches S13, S33, S553 and S73 of the second selector circuit 103 are connected in parallel and connected with the switch SL2 of the output control circuit 104.

The switches S11, S12, S13, S31, S32, S33, S51, S52, S53, S71, S72 and S73 are each constructed of an NMOS transistor as shown in FIG. 4C or a circuit in which an NMOS transistor and a PMOS transistor are connected in parallel with each other as shown in FIG. 4D.

Then, the output of an AND-OR circuit 401 is connected to the gate terminals of the switches S11, S12 and S13, while the output of an AND-OR circuit 402 is connected to the gate terminals of the switches S31, S32 and S33. The output of an AND circuit 403 is connected to the gate terminals of the switches S51, S52 and S53, while the output of an AND circuit 404 is connected to the gate terminals of the switches S71, S72 and S73.

The operation of the product-sum calculation circuit of this embodiment will be described next.

First, in the case where the input addresses (A2, A1, A0)=(0, 0, 0), the AND circuit 405 of the output control circuit 104 becomes active to turn on the switch S0. On the other hand, the circuits 406, 407 and 408 are inactive, and therefore, the switches SC, SL1 and SL2 are off. Therefore, a GND level is outputted to the output 011. That is, regardless of the constant selected by the addresses A3, through A6, the data 0 is amplified in the circuits 409 and 410 and outputted from the output 011. Likewise, the data 0 is outputted to all the outputs 00, 01, 02, 03, 04, 05, 06, 07, 08, 09, 010, 011 and 012 of the output control circuit 104 shown in FIG. 3.

Next, in the case where the input addresses (A2, A1, A0)=(0, 0, 1), the AND-OR circuit 401 of the second selector circuit 103 becomes active to turn on the switches S11, S12 and S13. The circuits 402, 403 and 404 are inactive, and therefore, the switches S31 through S33, S51 through S53 and S71 through S73 are off. The circuit 408 in the output control circuit 104 becomes active to turn on the switch SC. On the other hand, the circuits 405, 406 and 407 are inactive, and therefore, the switches S0, SL1 and SL2 are turned off. Therefore, the data ROM1 (Q11) is outputted through the switches S11 and SC and the circuits 409 and 410 from the output 011.

Then, ROM1 (Q0) is outputted to the output 00 of the output control circuit 104 shown in FIG. 3, ROM1 (Q1) is outputted to the output 01, and ROM1 (Q2) is outputted to the output 02. Likewise, ROM1 (Q3) through ROM1 (Q12) are outputted to the outputs 03 through 012. Consequently, the onefold value of the multiplicand Ck is outputted to the outputs 00 through 012.

Next, in the case where the input addresses (A2, A1, A0)=(0, 1, 0), the AND-OR circuit 401 becomes active to turn on the switches S11 through S13. On the other hand, the circuits 402, 403 and 404 are inactive, and therefore, the switches S31 through S33, S51 through S53 and S71 through S73 are off. The circuit 406 becomes active to turn on the switch SL1. On the other hand, the circuits 405, 407 and 408 are inactive, and therefore, the switches S0, SC and SL2 are turned off. Therefore, data ROM1 (Q10) is outputted through the switches S12 and SL1 and the circuits 409 and 410 to the output 011. That is, data of tenth bit of the onefold value of the multiplicand Ck is outputted to the output 011 of the eleventh bit. Likewise, data of the ninth bit of Ck×1 is outputted to the output 010. Likewise, data of the eighth bit through zero-th bit are outputted to the outputs 09 through 01. Then, zero is outputted to the output O0 according to the circuit construction. In the present embodiment, ROM1 (Q12) is directly outputted to the output 012. Q12 is zero when the constant is negative, and Q12 is one when the constant is positive.

Therefore, the onefold value Ck×1 (binary digit) of the constant Ck is selected, and Ck×1 is shifted leftward by one bit and outputted from the output control circuit 104. Consequently, the twofold value of the constant Ck is outputted to the outputs 01 through 00.

Next, in the case where the input addresses (A2, A1, A0)=(0, 1, 1), the AND-OR circuit 402 becomes active to turn on the switches S31 through S33. On the other hand, the circuits 401, 403 and 404 are inactive, and therefore, the switches S11 through S13, S51 through S53 and S71 through S73 are off. The circuit 408 becomes active to turn on the switch SC. On the other hand, the circuits 405, 406 and 407 are inactive, and therefore, the switches S0, SL1 and SL2 are turned off.

Therefore, data ROM3 (Q11) is outputted through the switches S31 and SC and the circuits 409 and 410 from the output 011. Likewise, data ROM3 (Q12) and ROM3 (Q10) through ROM3 (Q0) are outputted from the output 012 and output 010 through output 00. With this arrangement, the threefold value Ck×3 of the constant Ck is outputted to the outputs 012 through 00.

Next, in the case where the input addresses (A2, A1, A0)=(1, 0, 0), the AND-OR circuit 401 becomes active to turn on the switches S11 through S13. On the other hand, the circuits 402, 403 and 404 are inactive, and therefore, the switches S31 through S33, S51 through S53 and S71 through S73 are off. The circuit 407 becomes active to turn on the switch SL2. On the other hand, the circuits 405, 406 and 408 are inactive, and therefore, the switches S0, SC and SL1 are turned off. Therefore, data ROM1 (Q9) is outputted through the switches S13 and SL2 and the circuits 409 and 410 to the output O11. Likewise, ROM1 (Q8) is outputted to the output O10, and ROM1 (Q7) through ROM1 (Q0) are outputted to the output O9 through O2. Further, zero is outputted to the outputs O1 and O0 according to the circuit construction. With this arrangement, the onefold value Ck×1 of Ck is selected, and Ck×1 is shifted leftward by two bits and outputted to the outputs O11 through O0. Consequently, the fourfold value of Ck is outputted to the outputs O12 through O0.

Next, in the case where the input addresses (A2, A1, A0)=(1, 0, 1), the AND-OR circuit 403 becomes active to turn on the switches S51 through S53. On the other hand, the circuits 401, 402 and 404 are inactive, and therefore, the switches S11 through S13, S31 through S33 and S71 through S73 are off. The circuit 408 becomes active to turn on the switch SC. On the other hand, the circuits 405, 406 and 407 are inactive, and therefore, the switches S0, SL1 and SL2 are off. Therefore, data ROM5 (Q11) is outputted through the switches S51 and SC and the circuits 409 and 410 from the output O11. Likewise, data ROM5 (Q12) and ROM5 (Q10) through ROM5 (Q0) are outputted from the outputs O12 and O10 through O0. Consequently, the fivefold value Ck×5 of the constant Ck is selected and the value Ck×5 is outputted from the outputs O12 through O0.

Next, in the case where the input addresses (A2, A1, A0)=(1, 1, 0), the AND-OR circuit 402 becomes active to turn on the switches S31 through S33. On the other hand, the circuits 401, 403 and 404 are inactive, and therefore, the switches S11 through S13, S51 through S53 and S71 through S73 are off. The circuit 406 becomes active to turn on the switch SL1. On the other hand, the circuits 405, 407 and 408 are inactive, and therefore, the switches S0, SC and SL2 are off. Therefore, data ROM3 (Q10) is outputted through the switches S32 and SL1 and the circuits 409 and 410 from the output O11. That is, the data of the tenth bit of the threefold value of the multiplicand Ck is outputted to the output O11 of the eleventh bit. Likewise, data of the ninth bit of Ck×3 through data of the zero-th bit of Ck×3 are outputted to the outputs O10 through O1. Further, zero is outputted to the output O0 according to the circuit construction.

With this arrangement, the threefold value (binary digit) of the multiplicand Ck is shifted leftward by one bit and outputted to the outputs O12 through O0. Consequently, the sixfold value of the multiplicand Ck is outputted to the outputs O12 through O0.

Next, in the case where the input addresses (A2, A1, A0)=(1, 1, 1), the AND circuit 404 becomes active to turn on the switches S71 through S73. On the other hand, the circuits 401, 402 and 403 are inactive, and therefore, the switches S11 through S13, S31 through S33 and S51 through S53 are off. The circuit 408 becomes active to turn on the switch SC. On the other hand, the circuits 405, 406 and 407 are inactive, and therefore, the switches S0, SL1 and SL2 are off. Therefore, data ROM7 (Q11) is outputted through the switches S71 and SC and the circuits 409 and 410 from the output O11. Likewise, ROM7 (Q12) and ROM7 (Q10) through ROM7 (Q0) are outputted from the outputs O12 and O10 through O0. Thus, the sevenfold value Ck×7 of the multiplicand Ck is selected and outputted from the outputs O12 through O0.

The above operations are collectively listed in the following table.

| Input Addresses (A2, A1, A0) | Output of Second Selector Circuit 103 | Output of Output Control Circuit 104 |
| --- | --- | --- |
| (0, 0, 0) | Unselected | 0 |
| (0, 0, 1) | Ck × 1 | Ck × 1 × $2^0$ |
| (0, 1, 0) | Ck × 1 | Ck × 1 × $2^1$ |
| (1, 0, 0) | Ck × 1 | Ck × 1 × $2^2$ |
| (0, 1, 1) | Ck × 3 | Ck × 3 × $2^0$ |
| (1, 1, 0) | Ck × 3 | Ck × 3 × $2^1$ |
| (1, 0, 1) | Ck × 5 | Ck × 5 × $2^0$ |
| (1, 1, 1) | Ck × 7 | Ck × 7 × $2^0$ |

As described above, according to the present first embodiment, merely by storing the onefold, threefold, fivefold and sevenfold values of the multiplicand Ck respectively in the ROM1, ROM3, ROM5 and ROM7 of the data storage circuit 102, the zerofold, onefold, twofold, threefold, fourfold, fivefold, sixfold and sevenfold values of the multiplicand Ck can be outputted from the output control circuit 104. Therefore, the storage capacity of the data storage circuit 102 can be saved and the consumption power can be saved.

Second Embodiment

Figure 5:
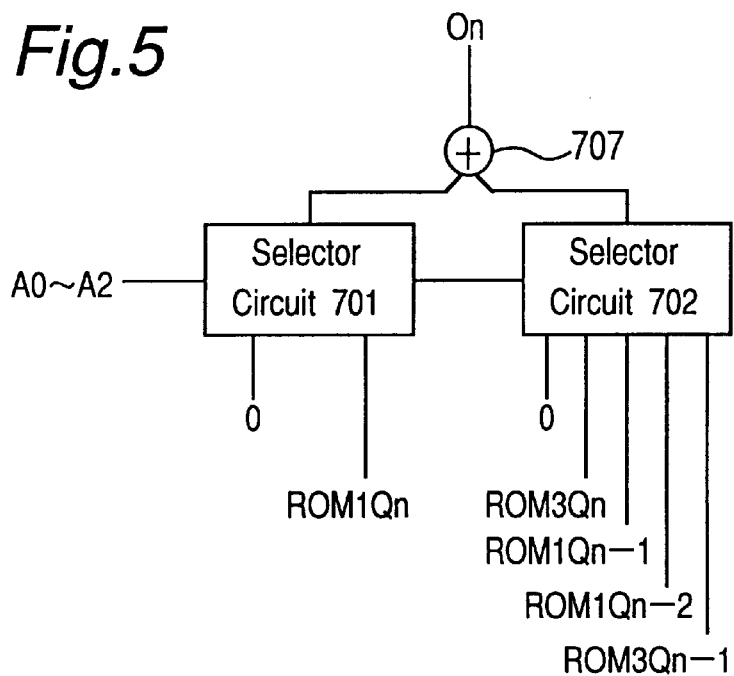
FIG. 5 is a diagram showing part of a second embodiment of the present invention.

Next, FIG. 5 shows the essential part of a second embodiment of the product-sum calculation circuit of the present invention. The present second embodiment differs from the first embodiment in that it includes an adder 707 which serves as a second output control section and selector circuits 701 and 702 connected between this adder 707 and the data storage circuit 102. The selector circuits 701 and 702 constitute the second selecting section and the first output control section.

To the selector circuit 701 are inputted data (ROM1Qn) from the data storage circuit 102 and zero. The data (ROM1Qn) is the data of the (n)th bit of the onefold value of the selected multiplicand Ck. To the selector circuit 702 are inputted data ROM3Qn, ROM1Q(n−1), ROM1Q(n−2) and ROM3Q(n−1) from the data storage circuit 102 and zero. ROM3Qn is the data of the (n)th bit of the threefold value of the selected multiplicand Ck, while ROM1Q(n−1) is the data of the (n−1)th bit of the onefold value of the multiplicand Ck. ROM1Q(n−2) is the data of the (n−2)th bit of the onefold value of the multiplicand Ck, while ROM3Q(n−1) is the data of the (n−1)th bit of the threefold value of the multiplicand Ck.

The selector circuits 701 and 702 of the present second embodiment selects the data from the ROM1 and ROM3 of the data storage circuit 102 according to the input addresses (A2, A1, A0) as described in the cases (1) through (8) as follows.

(1) When the input addresses (A2, A1, A0)=(0, 0, 0), both the selector circuits 701 and 702 select zero. Therefore, the adder 707 calculates 0+0 to output the zerofold value 0 of the multiplicand Ck.

(2) When the input addresses (A2, A1, A0)=(0, 0, 1), the selector circuit 701 selects ROM1(Qn), while the selector circuit 702 selects zero. Therefore, the adder 707 calculates Ck+0 to output the onefold value Ck×1 of the multiplicand Ck.

(3) When the input addresses (A2, A1, A0)=(0, 1, 0), the selector circuit 701 selects zero, while the selector circuit 702 selects ROM1(Qn−1). Therefore, the adder 707 adds Ck×$2^1$ and zero to output the twofold value Ck×2 of the multiplicand Ck.

(4) When the input addresses (A2, A1, A0)=(0, 1, 1), the selector circuit 701 selects zero, while the selector circuit 702 selects ROM3(Qn). Therefore, the adder 707 adds Ck×3 to zero to output the threefold value Ck×3 of the multiplicand Ck.

(5) When the input addresses (A2, A1, A0)=(1, 0, 0), the selector circuit 701 selects zero, while the selector circuit 702 selects ROM1(Qn−2). Therefore, the adder 707 adds Ck×$2^2$ to zero to output the $2^2$-fold value Ck×4 of the multiplicand Ck.

(6) When the input addresses (A2, A1, A0)=(1, 0, 1), the selector circuit 701 selects ROM1(Qn), while the selector circuit 702 selects ROM1(Qn−2). Therefore, the adder 707 adds Ck×$2^2$ to Ck to output Ck×5.

(7) When the input addresses (A2, A1, A0)=(1, 1, 0), the selector circuit 701 selects zero, while the selector circuit 702 selects ROM3(Qn−1). Therefore, the adder 707 adds Ck×3×$2^1$ to zero to output Ck×6.

(8) When the input addresses (A2, A1, A0)=(1, 1, 1), the selector circuit 701 selects ROM1(Qn), while the selector circuit 702 selects ROM3(Qn−1). Therefore, the adder 707 adds Ck×3×$2^1$ to Ck×1 to output Ck×7.

By the operations of the selector circuits 701 and 702 and the adder 707 as described in the above cases (1) through (8), merely by providing the partial product ROM1 which stores therein the onefold value of the constant Ck and the partial product ROM3 which stores therein the threefold value of Ck, all the products of the zerofold, onefold, twofold, threefold, fourfold, fivefold, sixfold and sevenfold values of the constant Ck can be obtained as the output of the adder 707.

In the present second embodiment, the data storage circuit 102 is required to be provided with only the ROM1 which stores therein Ck×1 and the ROM3 which stores therein Ck×3, and therefore, the ROM size can be further reduced and the consumption power can be reduced.

Third Embodiment

Figure 6:
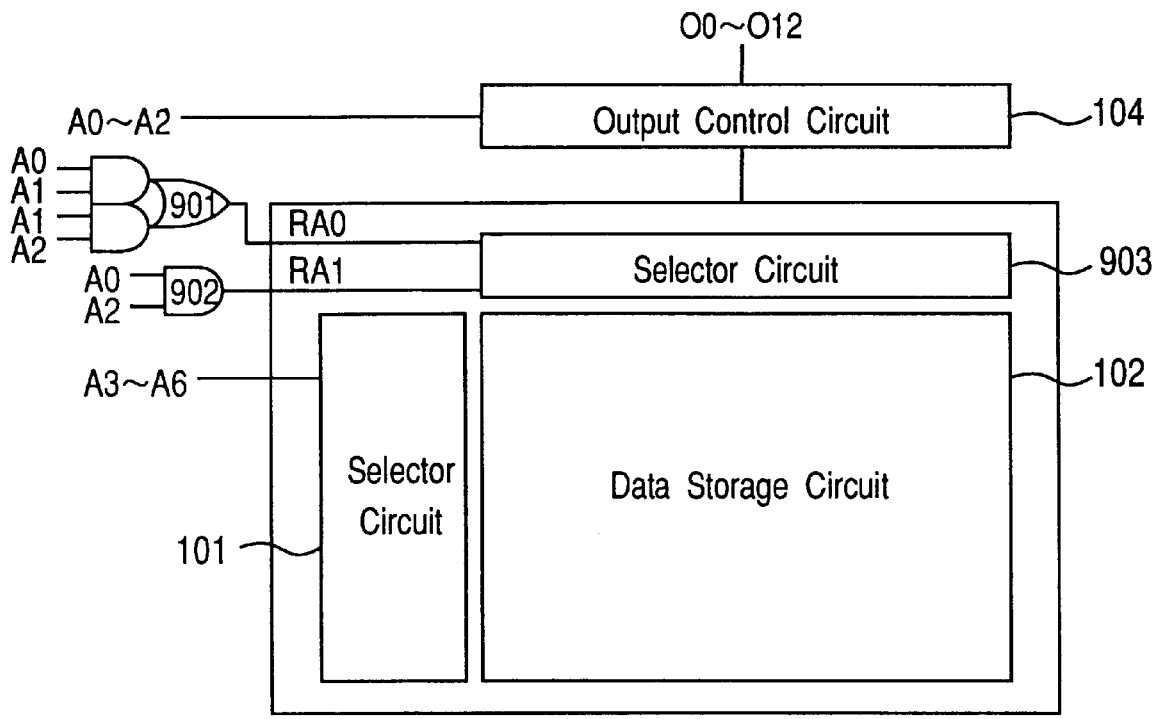
FIG. 6 is a block diagram showing a third embodiment of the present invention.

Next, FIG. 6 shows a third embodiment of the product-sum calculation circuit of the present invention. The present third embodiment differs from the first embodiment only in that it includes a selector circuit 903 to which circuits 902 and 901 are connected.

The output of the AND circuit 902 and the output of the AND-OR circuit 901 are connected to the selector circuit 903.

Relationships between the input addresses (A2, A1, A0), the outputs (RA1, RA0) of the circuits 901 and 902, the output of the selector circuit 903 and the output of the output control circuit 104 are shown in the following table. As shown in the following table, the circuit is constructed so that the selector circuit 903 outputs Ck×1 when the outputs (RA1, RA0) are (0, 0), the selector circuit 903 outputs Ck×3 when the outputs (RA1, RA0) are (0, 1), the selector circuit 903 outputs Ck×5 when the outputs (RA1, RA0) are (1, 0) and the selector circuit 903 outputs Ck×7 when the outputs (RA1, RA0) are (1, 1).

Then, by the operation of the output control circuit 104 similar to that of the first embodiment, a signal from the selector circuit 903 is shifted to allow not only the onefold, threefold, fivefold and sevenfold data of the multiplicand Ck but also the zerofold, twofold, fourfold and sixfold data of the multiplicand Ck to be outputted as in the following table.

Therefore, the amount of data to be stored in the data storage circuit 102 can be reduced and the storage capacity is allowed to be small. Therefore, the ROM can be made small and the consumption power can be reduced.

| Input Addresses (A2, A1, A0) | Circuit Outputs (RA1, RA0) | Output of Selector Circuit 903 | Output of Output Control Circuit 104 |
|---|---|---|---|
| (0, 0, 0) | (0, 0) | Ck × 1 | 0 |
| (0, 0, 1) | (0, 0) | Ck × 1 | Ck × 1 × $2^0$ |
| (0, 1, 0) | (0, 0) | Ck × 1 | Ck × 1 × $2^1$ |
| (1, 0, 0) | (0, 0) | Ck × 1 | Ck × 1 × $2^2$ |
| (0, 1, 1) | (0, 1) | Ck × 3 | Ck × 3 × $2^0$ |
| (1, 1, 0) | (0, 1) | Ck × 3 | Ck × 3 × $2^1$ |
| (1, 0, 1) | (1, 0) | Ck × 5 | Ck × 5 × $2^0$ |
| (1, 1, 1) | (1, 1) | Ck × 7 | Ck × 7 × $2^0$ |

As described above, according to the present invention, when a multiplier X a multiplicand Ck are selected, the selecting section selects the product Ck×X obtained by multiplying the multiplicand Ck by the multiplier X and outputs the product to the first output control section. Then, the output control section outputs the product Ck×X without shifting the product.

When ($2^n$)X is selected as the multiplier, the selecting section selects the product Ck×X obtained by multiplying the multiplicand Ck by the multiplier X and outputs the product to the output control section similar to the case where the multiplier X is selected. In this case, the output control section shifts leftward the product Ck×X by n bits to output the ($2^n$)-fold value of (Ck×X).

Therefore, assuming that X is an odd-number, not only the data of the odd-number-fold data of Ck but also the ($2^n$)-fold data of Ck×X can be outputted merely by storing the odd-number-X-fold data Ck×X of the multiplicand Ck in the data storage circuit. Therefore, the amount of data to be stored in the data storage circuit can be reduced, by which the product-sum calculation circuit can be constructed so as to have a small storage capacity and the consumption power can be reduced.

When the output control circuit shifts rightward the product Ck×X by n bits, ($2^{-n}$)-fold data of Ck×X can be outputted.

In the product-sum calculation circuit of one embodiment, when the multiplier X is selected, the product Ck×X is selected by the selecting section, and the product is outputted to the second output control section through the first output control section without being shifted. Then, the second output control section outputs the product Ck×X. When 2X is selected as the multiplier, the product Ck×X is selected by the selecting section, and this product Ck×X is shifted leftward by one bit by the first output control section, so that the twofold value of (Ck×X) is outputted to the second output control section. Then, the second output control section outputs the product (Ck×X)×2.

Further, when (X+2X) is selected as the multiplier, the product Ck×X is selected by the selecting section, and the twofold value of (Ck×X) obtained by shifting leftward the product (Ck×X) by one bit by the first output-control section and the product (Ck×X) are outputted to the second output control section. Then, the second output control section can output the threefold value of the product Ck×X by adding (Ck×X) to (Ck×X)×2.

Therefore, according to this embodiment, merely by storing the onefold value of the product Ck×X in the data storage circuit, the onefold, twofold and threefold values of the product Ck×X can be outputted from the second output control section. Therefore, the amount of data to be stored in the data storage circuit can be further reduced and the product-sum calculation circuit can be constructed so as to have a smaller storage capacity. Therefore, the consumption power can be further reduced.

It is acceptable to output the fourfold value of (Ck×X) obtained by shifting leftward the product (Ck×X) by two bits and the product (Ck×X) from the first output control section and subtract (Ck×X) from (Ck×X)×4 in the second output control section when (X+2X) is selected as the multiplier, thereby outputting the threefold value of the product Ck×X. Even in this case, merely by storing the onefold value of the product Ck×X in the data storage circuit, the onefold, threefold and fourfold values of the product Ck can be outputted from the second output control section. Therefore, the storage capacity of the data storage. Circuit can be reduced, by which the product-sum calculation circuit can be constructed so as to have a smaller storage capacity and the consumption power can be reduced.

In one embodiment, when zero is selected as the multiplier, the output prohibiting section prohibits the output of the product signal from the second selecting section. Therefore, without storing the zerofold data of the multiplicand in the data storage circuit, the zerofold value of the multiplicand can be outputted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A product-sum calculation circuit comprising:

a data storage circuit which stores therein products of a plurality of multiplicands and a plurality of multipliers;

a selecting section which selects a multiplicand and a multiplier, reads out a product signal related to a product of the selected multiplicand and the selected multiplier from the data storage circuit, and outputs the product signal; and a first output control section which determines by selection according to the multiplier or the multiplicand whether to output the product signal outputted from the selecting section while shifting the product signal by n (n: integer) bits or output the product signal without shift, and outputs the product signal in the selected manner.

2. A product-sum calculation circuit as claimed in claim 1, comprising:

a second, output control section which executes addition or subtraction on the product signal outputted from the first output control section, and outputs the executed product signal.

3. A product-sum calculation circuit as claimed in claim 1, wherein the first output control section comprises an output prohibiting section which prohibits the output of the product signal from the selecting section when zero is selected as the multiplier.

* * * * *